United States Patent
Santhanagopalan et al.

(10) Patent No.: US 12,548,803 B2
(45) Date of Patent: Feb. 10, 2026

(54) REGENERATION OF ELECTRODES BY RECYCLING SPENT RECHARGEABLE LITHIUM BATTERIES

(71) Applicant: AMRITA VISHWA VIDYAPEETHAM, Kerala (IN)

(72) Inventors: Dhamodaran Santhanagopalan, Kerala (IN); Shantikumar Nair, Kerala (IN); Binitha Gangaja, Kerala (IN)

(73) Assignee: AMRITA VISHWA VIDYAPEETHAM, Kerala (IN)

( * ) Notice: Subject to any disclaimer, the term of this patent is extended or adjusted under 35 U.S.C. 154(b) by 985 days.

(21) Appl. No.: 17/687,351

(22) Filed: Mar. 4, 2022

(65) Prior Publication Data

US 2023/0207894 A1    Jun. 29, 2023

(30) Foreign Application Priority Data

Dec. 29, 2021 (IN) .............................. 202141061590

(51) Int. Cl.
| | |
|---|---|
| H01M 4/00 | (2006.01) |
| H01M 4/58 | (2010.01) |
| H01M 10/0525 | (2010.01) |
| H01M 10/42 | (2006.01) |
| H01M 4/02 | (2006.01) |

(52) U.S. Cl.
CPC ..... *H01M 10/4242* (2013.01); *H01M 4/5825* (2013.01); *H01M 10/0525* (2013.01); *H01M 2004/028* (2013.01)

(58) Field of Classification Search
CPC .... H01M 10/4242; H01M 10/54; H01M 4/58; H01M 4/136; H01M 4/5825; H01M 10/0525
See application file for complete search history.

(56) References Cited

U.S. PATENT DOCUMENTS 9,199,850 B2    12/2015  Kim et al.
2018/0261894 A1  9/2018  Wang et al.

OTHER PUBLICATIONS

Electrochemical and Solid-State Letter, 2006, p. A151-A155 (Year: 2006).*
Journal of Power Sources, 2014, vol. 256, p. 274-280 (Year: 2014).*
Journal of Cleaner Production, vol. 316, Sep. 20, 2021 (Year: 2021).*
Adepoju, A. A.; Williams, Q. L., "High C-Rate Performance of LifePO4/Carbon Nanofibers Composite Cathode for Li-Ion Batteries." Curr. Appl. Phys. 2020, 20 (1), 1-4.
Ali, G.; Lee, J. H.; Susanto, D.; Choi, S. W.; Cho, B. W.; Nam, K. W.; Chung, K. Y. "Polythiophene-Wrapped Olivine NaFePO4 as a Cathode for Na-Ion Batteries." ACS Appl. Mater. Interfaces 2016, 8 (24), 15422-15429.
Berlanga, C.; Armand, M.; Casas-cabanas, M. "Cost-E Ff Ective Synthesis of Triphylite—NaFePO4 Cathode: A Zero-Waste Process." 2020, 8, 725-730.
Cao, Y.; Zhang, T.; Zhong, X.; Zhai, T.; Li, H. "A Safe, Convenient Liquid Phase Pre-Sodiation Method for Titanium-Based SIB Materials." Chem. Commun. 2019, 55 (98), 14761-14764.
Choi, D.; Kumta, P. N. "Surfactant Based Sol-Gel Approach to Nanostructured LiFePO4 for High Rate Li-Ion Batteries." J. Power Sources 2007, 163 (2), 1064-1069.
Croce, F.; D'Epifanio, A.; Hassoun, J.; Deptula, A.; Olczac, T.; Scrosati, B. "A Novel Concept for the Synthesis of an Improved LiFePO4 Lithium Battery Cathode." Electrochem. Solid-State Lett. 2002, 5 (3), 47-50.
Dabrowska, S.; Chudoba, T.; Wojnarowicz, J.; Łojkowski, W. "Current Trends in the Development of Microwave Reactors for the Synthesis of Nanomaterials in Laboratories and Industries: A Review." Crystals 2018, 8 (10), 1-26.
Dedryvere, R.; Maccario, M.; Croguennec, L.; Le Cras, F.; Delmas, C.; Gonbeau, D., "X-Ray Photoelectron Spectroscopy Investigations of Carbon-Coated Li XFePO4 Materials." Chem. Mater. 2008, 20 (22), 7164-7170.
Dodd, J. L.; Yazami, R.; Fultz, B. "Phase Diagram of LixFePO4." Electrochem. Solid-State Lett. 2006, 9 (3), A151.
Elwert, T., et.al., "Recycling of Lithium Iron Phosphate Batteries: Future Prospects and Research Need," Materials Science Forum, 2019, 959, 49-68.
Fang, Y.; Liu, Q.; Xiao, L.; Ai, X.; Yang, H.; Cao, Y., "High-Performance Olivine NaFePO4 Microsphere Cathode Synthesized by Aqueous Electrochemical Displacement Method for Sodium Ion Batteries." ACS Appl. Mater. Interfaces 2015, 7 (32), 17977-17984.
Huang, Y. H.; Goodenough, J. B., "High-Rate LiFePO4 Lithium Rechargeable Battery Promoted by Electrochemically Active Polymers." Chem. Mater. 2008., 20 (23), 7237-7241.
Ioakimidis, C. S.; Murillo-Marrodan, A.; Bagheri, A.; Thomas, D.; Genikomsakis, K. N. "Life Cycle Assessment of a Lithium Iron Phosphate (LFP) Electric Vehicle Battery in Second Life Application Scenarios." Sustain. 2019, 11 (9), 2527.
Karthik, M.; Sathishkumar, S.; BoopathiRaja, R.; Meganathan, K. L.; Sumathi, T. Design and Fabrication of NaFePO4/MWCNTs Hybrid Electrode Material for Sodium-Ion Battery. J. Mater. Sci. Mater. Electron. 2020.
Kim, J.; Seo, D.-H.; Kim, H.; Park, I.; Yoo, J.-K.; Jung, S.-K.; Park, Y.-U.; Goddard III, W. A.; Kang, K. Unexpected Discovery of Low-Cost Maricite NaFePO4 as a High-Performance Electrode for Na-Ion Batteries. Energy Environ. Sci. 2015, 8 (2), 540-545.
Lebedeva, N, et.al., Lithium Ion Battery Value Chain and Related Oppurtunities for Europe, European Commission, Petten, 2016.

(Continued)

*Primary Examiner* — Tiffany Legette
*Assistant Examiner* — Douglas C Marroquin
(74) *Attorney, Agent, or Firm* — Quarles & Brady, LLP

(57) ABSTRACT

The present invention relates to a rechargeable battery and a process near zero-energy regeneration of electrodes by recycling spent rechargeable batteries. The present invention relates to a process for near zero-energy regeneration of lithium iron phosphate (LiFePO$_4$) or sodium iron phosphate (NaFePO$_4$) cathode by recycling spent Lithium ferro phosphate rechargeable batteries.

9 Claims, 10 Drawing Sheets

(56) References Cited

OTHER PUBLICATIONS

Li, H.; Xing, S.; Liu, Y.; Li, F.; Guo, H.; Kuang, G. Recovery of Lithium, Iron, and Phosphorus from Spent LiFePO4 Batteries Using Stoichiometric Sulfuric Acid Leaching System. ACS Sustain. Chem. Eng. 2017, 5 (9), 8017-8024.

Li, X.; Zhang, J.; Song, D.; Song, J.; Zhang, L. Direct Regeneration of Recycled Cathode Material Mixture from Scrapped LiFePO4 Batteries. J. Power Sources 2017, 345, 78-84.

Lin, M.; Wu, X.; Chen, B. L.; Yuan, J. K. Hydrothermal Synthesis of Corn Cob-Like LiFePO4/C as High Performance Cathode Material for Lithium Ion Batteries. Adv. Sci. Technol. 2014, 93 (Nov. 2014), 152-157.

Liu, Y.; Gu, Y.-J.; Luo, G.-Y.; Chen, Z.-L.; Wu, F.-Z.; Dai, X.-Y.; Mai, Y.; Li, J.-Q. Ni-Doped LiFePO4/C as High-Performance Cathode Composites for Li-Ion Batteries. Ceram. Int. 2020, 46 (10), 14857-14863.

Oh, S. M.; Myung, S. T.; Hassoun, J.; Scrosati, B.; Sun, Y. K. Reversible NaFePO4 Electrode for Sodium Secondary Batteries. Electrochem. commun. 2012, 22 (1), 149-152.

Padhi, A. K. Phospho-Olivines as Positive-Electrode Materials for Rechargeable Lithium Batteries. J. Electrochem. Soc. 1997, 144 (4), 1188.

Peng, L.; Zhao, Y.; Ding, Y.; Yu, G. Self-Assembled LiFePO4 Nanowires with High Rate Capability for Li-Ion Batteries. Chem. Commun. 2014, 50 (67), 9569-9572.

Rahman, M. M.; Sultana, I.; Mateti, S.; Liu, J.; Sharma, N.; Chen, Y. Maricite NaFePO4/C/Graphene: A Novel Hybrid Cathode for Sodium-Ion Batteries. J. Mater. Chem. A 2017, 5 (32), 16616-16621.

Shin, E. J.; Kim, S.; Noh, J. K.; Byun, D.; Chung, K. Y.; Kim, H. S.; Cho, B. W. A Green Recycling Process Designed for LiFePO4 Cathode Materials for Li-Ion Batteries. J. Mater. Chem. A 2015, 3 (21), 11493-11502.

Song, X.; Hu, T.; Liang, C.; Long, H. L.; Zhou, L.; Song, W.; You, L.; Wu, Z. S.; Liu, J. W. Direct Regeneration of Cathode Materials from Spent Lithium Iron Phosphate Batteries Using a Solid Phase Sintering Method. RSC Adv. 2017, 7 (8), 4783-4790.

Wang, L.; Li, J.; Zhou, H.; Huang, Z.; Tao, S.; Zhai, B.; Liu, L.; Hu, L. Regeneration Cathode Material Mixture from Spent Lithium Iron Phosphate Batteries. J. Mater. Sci. Mater. Electron. 2018, 29 (11), 9283-9290.

Wang, W.; Wu, Y. An Overview of Recycling and Treatment of Spent LiFePO4 Batteries in China. Resour. Conserv. Recycl. 2017, 127 (100), 233-243.

Wang, X.; Feng, Z.; Hou, X.; Liu, L.; He, M.; He, X.; Huang, J.; Wen, Z. Fluorine Doped Carbon Coating of LiFePO4 as a Cathode Material for Lithium-Ion Batteries. Chem. Eng. J. 2020, 379 (Jul. 2019), 122371.

Wen, J.; Yu, Y.; Chen, C. A Review on Lithium-Ion Batteries Safety Issues: Existing Problems and Possible Solutions. Mater. Express 2012, 2 (3), 197-212.

Wongittharom, N.; Lee, T. C.; Wang, C. H.; Wang, Y. C.; Chang, J. K. Electrochemical Performance of Na/NaFePO4 Sodium-Ion Batteries with Ionic Liquid Electrolytes. J. Mater. Chem. A 2014, 2 (16), 5655-5661.

Yang, F.; Zhang, H.; Shao, Y. J.; Song, H.; Liao, S.; Ren, J. Formic Acid as Additive for the Preparation of High-Performance FePO4 Materials by Spray Drying Method. Ceram. Int. 2017, 43 (18), 16652-16658.

Yang, Y.; Meng, X.; Cao, H.; Lin, X.; Liu, C.; Sun, Y.; Zhang, Y.; Sun, Z. Selective Recovery of Lithium from Spent Lithium Iron Phosphate Batteries: A Sustainable Process. Green Chem. 2018, 20 (13), 3121-3133.

Yang, Y.; Zheng, X.; Cao, H.; Zhao, C.; Lin, X.; Ning, P.; Zhang, Y.; Jin, W.; Sun, Z. A Closed-Loop Process for Selective Metal Recovery from Spent Lithium Iron Phosphate Batteries through Mechanochemical Activation. ACS Sustain. Chem. Eng. 2017, 5 (11), 9972-9980.

Yuan, M.; Li, Y.; Zhang, K.; Li, Y.; Yao, Y. One-Step Liquid Phase Synthesis of LifePO4@C Composite as High Performance Cathode Material for Lithium-Ion Batteries. Nano 2020, 15 (06), 2050080.

\* cited by examiner

REGENERATION OF ELECTRODES BY RECYCLING SPENT RECHARGEABLE LITHIUM BATTERIES

CROSS-REFERENCE TO RELATED APPLICATION

This application claims priority to Indian Patent Application Number 202141061590, filed on Dec. 29, 2021, which is hereby incorporated by reference in its entirety for all purposes.

FIELD OF THE INVENTION

The present invention pertains to the field of physical chemistry and relates to a process for the near zero-energy regeneration of spent rechargeable batteries. The present invention specifically relates to a close looped process for near zero-energy regeneration of lithium iron phosphate ($LiFePO_4$) or sodium iron phosphate ($NaFePO_4$) cathode by recycling spent Lithium ferro phosphate rechargeable batteries.

BACKGROUND ART

In the past decades, lithium-ion batteries (LIBs) have been widely utilized in various applications such as consumer electronics because of their superior energy density, long life type and discharging capability. Lithium-ion batteries (LIBs) generally include an anode, an electrolyte, and a cathode that contains lithium in the form of a lithium-transition metal oxide. Lithium-ion batteries (LIBs) may subsequently be used for utility energy storage and are eventually considered to have reached the end of their useful life.

Environmental issues of spent lithium-ion batteries (LIBs) have attracted widespread concern in the public. If usable materials can be recovered from used batteries, less raw materials will be needed to be extracted from the limited supplies in the ground. In addition, significant negative environmental impacts caused by mining and processing ores (e.g., SOx emissions from smelting of sulfide ores, such as those that yield copper, nickel, and cobalt) are avoided if the used lithium-ion batteries (LIBs) can be recycled.

Currently, methods for recycling waste lithium-ion batteries (LIBs) can be divided into two broad types: leaching method, and combination method of calcination and leaching.

Generally, leaching method includes steps of crushing or chopping battery, leaching with acid, separating the leached materials by precipitation, complexation and/or extraction. However, leaching involves complex leachate composition and multiple separation steps creating large amounts of secondary waste.

Combination method of calcination and leaching includes steps of crushing or chopping battery, calcinating, leaching with acid, separating the leached materials, etc. However, this method has the additional disadvantage of high energy consumption caused by the heat-treating process. Besides, recovery rate of the electrode materials is low since some components of the electrode materials are burned into carbon dioxide and other harmful substances.

Due to massively growing demand arising from energy storage systems, sodium ion batteries (SIBs) have been recognized as the most attractive alternative to the current commercialized lithium-ion batteries (LIBs) owing to the wide availability and accessibility of sodium. Sodium battery technology could be a promising alternative to lithium-ion batteries (LIBs) for grid-level energy storage due to the widely established competitive energy and power densities, low cost, and environmental benignity of sodium batteries.

Lithium-ion batteries are in the forefront of energy storage market especially, lithium iron phosphate ($LiFePO_4$, LFP) batteries. Nevertheless, the increased production and use of lithium-ion battery has led to a substantial growth of spent/failed & end-of-life (batteries with 80% of actual capacity) lithium-ion batteries. It has been estimated that by 2020 there will be around 500,000 tons of spent lithium-ion batteries generated around the globe. Additionally, there will be resource restrictions predicted (Li, Co availability) due to the exponential increase in LIB usage. Though Lithium ferro phosphate battery (LFP) based batteries does not lead the battery market currently, it has been reported that almost 69% of the batteries produced in China (2015) accounts for LFP based cells. Though this is a geographically restricted report, Lebedeva et al., reported that there will be double the surge in demand for Lithium ferro phosphate battery (LFP) active material by 2025 as compared to 2015. Lithium ferro phosphate battery (LFP) batteries can provide better electrochemical performance, temperature stability, safety and cycling life.

This signifies that even though market shares of Lithium ferro phosphate battery (LFP) may decrease in the coming years (NMC being dominant in the market), the production of Lithium ferro phosphate battery (LFP) based cells are not expected to diminish. Moreover, literature has suggested that there is an increased possibility of using Lithium ferro phosphate battery (LFP) based electric vehicle batteries as second life batteries which would increase use of Lithium ferro phosphate battery (LFP). This emphasizes the need for proper recycling or recovery of valuable components from spent batteries; otherwise, LIB may not be sustainable in the long term and may also adversely impact the environment. For example, Lithium ferro phosphate battery (LFP) contains toxic components if dumped in landfills and should be recycled to minimize environmental impacts.

Today, one of major problems that manufactures of the lithium or sodium batteries are trying to solve relates protection of the global environment. Nevertheless, there are drawbacks that rechargeable batteries are costly, a rechargeable battery needs a charger for recharging, a long time is often required for recharging, etc. As a result, many users choose not to use rechargeable batteries. Prior batteries formed of multiple cells have been constructed as a single unit so that if even a single cell becomes defective, the entire battery must be discarded and recycled. These prior batteries also can become excessively hot during use.

Elwart et. al., reported that the universally adopted pyrometallurgical processing combined with hydrometallurgical approaches are not effective for LFP cells. This emphasizes the need for designing new closed loop and energy efficient recycling processes in order to recycle LFP.

U.S. Pat. No. 9,199,850B2 (2015) discloses a process to recycle, and regenerate spent LFP uses solid-state processing which requires high temperature processing. The temperature used is of the order of 400 to 800° C. for about 6 to 24 hrs [For example: mixing $Li_2CO_3$ and $FePO_4$ with Fe to Li mole ratio 1:1 and performing heat treatment in reducing or inert atmosphere]. In another process described in US patent: US20180261894A1 (2018), carbon coated $LiFePO_4$ from recycled $FePO_4$ was developed by ball-milling for 2 hrs (with the mole ratio of Li:Fe:P:C=1.05:1:1:

1.05) $Li_2CO_3$ and $FePO_4$. After ball-milling sintering the mixture at 700° C. for 16 hours in nitrogen atmosphere was carried out.

While there is extensive literature on recovering economically valuable components like Co, Li, Ni, Mn from spent LIBs is being explored significantly, but the recycling of the so called 'environmentally friendly' Lithium ferro phosphate battery (LFP) based spent cells have been neglected. This is predominantly because the content of economically value components is limited in LFP cells as compared to other cathodes like NMC, LCO etc. Accordingly, there is growing need for the development of a process for recycling and regeneration of spent rechargeable batteries. It is known in the art that a direct chemical lithiation process to supplement the deficient concentration of lithium in the recovered Lithium ferro phosphate battery (LFP) material for reuse is not suitable because the recovered LFP from different batteries will have varying degrees of Li deficiency and having a composition $Li_xFePO_4$ with x varying anywhere between 0 and 1. Further, conventional lithiation of spent Lithium ferro phosphate battery (LFP) promotes side reactions during chemical lithiation process that can lead to poor performance of the re-lithiated Lithium ferro phosphate battery (LFP). Thus, there is need for a process for the near zero-energy regeneration of spent rechargeable batteries.

SUMMARY

The present invention relates to a process for the near zero-energy regeneration of spent rechargeable batteries. The present invention specifically relates to a process for near zero-energy regeneration of lithium iron phosphate ($LiFePO_4$) or sodium iron phosphate ($NaFePO_4$) electrodes by recycling spent Lithium ferro phosphate rechargeable batteries. The process is a closed looped.

The present invention is based on the recycling, and near zero-energy regeneration of spent Lithium ferro phosphate battery (LFP) based lithium-ion or sodium-ion battery electrodes for reuse in lithium-ion and sodium-ion battery applications.

The closed loop process for recycling spent LFP batteries is done with compounds similar to $LiFePO_4$ compound, such as: $LiMnPO_4$ or $LiCoPO_4$ and mixed metal phosphates such as, $LiFe_xM_{1-x}PO_4$ (where M=Mn, Co, Ni and x may vary between 0 and 1).

Objectives of the Invention

An objective of the present invention is to provide a process for recycling and near zero-energy regeneration of lithium iron phosphate ($LiFePO_4$) and sodium iron phosphate ($NaFePO_4$) electrodes by recycling spent Lithium ferro phosphate (LFP) recovered from spent rechargeable batteries. The process of the invention is preferably closed looped. Another objective of the present invention is to provide a recycled Lithium ferro phosphate (LFP) or sodium ferro phosphate electrodes for use in rechargeable batteries obtained by the process of the present invention.

BRIEF DESCRIPTION OF THE FIGURES

The accompanying drawings illustrate some of the embodiments of the present invention and together with the descriptions, serve to explain the invention. These drawings have been provided by way of illustration and not by way of limitation. The components in the drawings are not necessarily drawn to scale, emphasis instead being placed upon clearly illustrating the principles of the aspects of the embodiments.

DETAILED DESCRIPTION OF THE INVENTION

Figure 1:
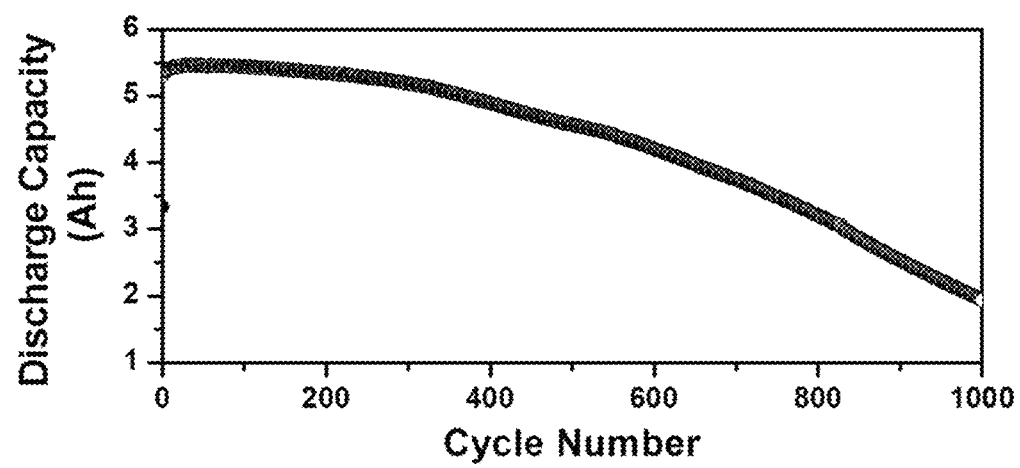
FIG. 1.: Cycling performance of the commercial cell for 1000 cycles at 5 A current rate.

At the very outset of the detailed description, it may be understood that the ensuing description only illustrates a particular form of this invention. However, such a particular form is only exemplary embodiment, and without intending to imply any limitation on the scope of this invention. Accordingly, the description is to be understood as an exemplary embodiment and teaching of invention and not intended to be taken restrictively.

Unless defined otherwise, technical and scientific terms used herein have the same meaning as commonly understood by one of ordinary skill in the art to which this invention belongs. Further, unless otherwise required by context, singular terms shall include pluralities and plural terms shall include the singular.

The present invention discloses a process which operates at a temperature ranging from 25° C. to 100° C. for recycling spent rechargeable batteries, a near zero-energy regeneration process of both lithium and sodium ion electrodes for use in rechargeable battery applications.

An aspect of the present invention is that the process can be modified depending on the type of the rechargeable battery for example, the spent Lithium ferro phosphate battery (LFP) which is first delithiated for the regeneration of ferro phosphate which is either converted to fresh Lithium ferro phosphate electrode (LFP) for Lithium-ion batteries, or sodium ion electrode for sodium ion batteries, for use in battery application.

In an embodiment the process includes dilithiation of the spent LFP batteries. The recycled ferro phosphate electrode, is subjected to lithiation process which operates at a temperature below or equal to 100° C. and hence is energy efficient for the recycle and regeneration of rechargeable batteries.

It is known in the art that a direct chemical lithiation process to supplement the deficient concentration of lithium in the recovered Lithium ferro phosphate battery (LFP) material for reuse is not suitable because the recovered LFP from different batteries will have varying degrees of Li deficiency and having a composition $Li_xFePO_4$ with x varying anywhere between 0 and 1. Further, conventional lithiation of spent Lithium ferro phosphate battery (LFP) promotes side reactions during chemical lithiation process that can lead to poor performance of the re-lithiated Lithium ferro phosphate battery (LFP).

In an embodiment, the process discloses recycling of spent lithium ferro phosphate battery wherein $FePO_4$ is obtained by complete dilithiation (or oxidation of $Li_xFePO_4$). This homogenous $FePO_4$ is subsequently lithiated chemically to form $LiFePO_4$ without any high temperature processing. This $LiFePO_4$ is then tested for its electrochemical performance as Li-ion battery cathode.

In another embodiment, the process discloses recycling of spent lithium ferro phosphate battery wherein $FePO_4$ is obtained by complete dilithiation (or oxidation of $Li_xFePO_4$). This homogenous $FePO_4$ is subjected to sodiation to form $NaFePO_4$ without any high temperature processing such that the $NaFePO_4$ can be reused as Na-ion battery cathode material.

Accordingly, an important embodiment of the present invention is for a process for regeneration of $LiFePO_4$ or $NaFePO_4$ cathode from spent Lithium ferro phosphate rechargeable battery (LFP), the process comprising the steps of:
a. de-lithiating the spent LFP battery by adding an oxidizer in a molar ratio of 0.5 and the ratio of LFP to oxidizer is 2:1 to form pure $FePO_4$,
b. chemically lithiating the $FePO_4$ by adding a lithiating agent in a solvent based on the amount of $FePO_4$ in stoichiometric ratio of $FePO_4$ to lithiating agent of 1:1.0-3.5 at a temperature of 25° C.-100° C. for lithiation time ranging 1-30 minutes, or
c. chemically sodiating the pure $FePO_4$ by adding a sodiating agent in a solvent based on the amount of $FePO_4$ in stoichiometric ratio of $FePO_4$ to sodiating agent of 1:1.0-4.2 at a temperature of 25° C.-100° C. for sodiation time of ranging 1-30 minutes,
d. obtaining the regenerated pure $LiFePO_4$ or $NaFePO_4$ electrodes with the characteristics as the original lithium or sodium ferro phosphate battery (LFP or NFP).

In an aspect, the oxidizer is one of potassium persulphate ($K_2S_2O_8$) or sodium persulphate ($Na_2S_2O_8$) a combination thereof.

In another aspect, the dilithiation/oxidation is carried out using a micro-wave assisted chemical process in oxidation solution or chemical process in oxidation solution.

The dilithiation/oxidation is carried out for 15 mins in micro-wave (with 250 W power) in oxidation solution and mole ratio of LFP to oxidizer is 2:1 (example: 1 gram of spent LFP, 0.86 gram of $K_2S_2O_8$ oxidizer in 30 ml of DI water).

The chemical dilithiation/oxidation is carried for 1 hr. in an oxidation solution in the mole ratio of 2:1 (example: 1 gram of LFP, 0.86 gram of $K_2S_2O_8$ oxidizer in 30 ml of DI water) on a hot plate at a temperature of 70° C.

The solvent for dilithiation is deionized water.

The solvent for lithiation is one of, acetonitrile or isopropyl alcohol.

In an aspect the process of lithiation is carried at a temp ranging 25° C. to 100° C.

In an aspect the process of lithiation time ranges from 1-30 minutes.

In an aspect the lithiating agent of the process is one of lithium iodide (LiI) or lithium bromide (LiBr).

In another aspect the sodiating agent of the process is one of sodium iodide (NaI) or sodium bromide (NaBr).

In an embodiment the disclosure is for a regenerated lithium ferro phosphate electrode or a sodium ferro phosphate electrode obtained by recycling the spent LFP rechargeable batteries from the process of the invention.

The regenerated lithium ferro phosphate electrode delivered discharge capacity of 150 mAh/g at 1C and was able to cycle for 200 cycles at 5C rate retaining 90% of initial capacity.

The regenerated sodium ferro phosphate electrode delivered discharge capacity of 150 mAh/g at 1C and was able to provide 85% capacity retention for 150 cycles at a current rate of C/1.5.

The closed loop process for recycling spent LFP batteries is done with compounds similar to $LiFePO_4$ compound, such as: $LiMnPO_4$ or $LiCoPO_4$ and even mixed metal phosphates such as, $LiFe_xM_{1-x}PO_4$ (where M=Mn, Co, Ni and x may vary between 0 and 1).

Abbreviations and Definitions

Spent-LFP—spent Lithium phosphate electrode recovered from a failed battery,
FP-MW microwave delithiated Spent-$LiFePO_4$,
CL-FP chemically lithiated $FePO_4$ and CS-FP for chemically sodiated $FePO_4$ respectively.
Closed loop process—is defined as a process including recovery from the spent battery, oxidizing to $FePO_4$ and chemically lithiating or sodiating to produce regenerated LFP or NaFP
Stoichiometric ratio-the mole fraction of LFP to oxidizer.
Spent/failed batteries are used synonymously and have the same meaning and used interchangeably throughout the specification Examples Without limiting the scope of the present invention as described above in any way, the present invention has been further explained through the examples provided below.
Obtaining Spent Lithium Ferro Phosphate Electrode from Spent Lithium Ferro Phosphate Batteries Lithium ferro phosphate electrode was obtained from spent LFP rechargeable batteries. The failed battery cathode ($LiFePO_4$) was removed from the aluminum current collector by an ultra-sonication process.

Extraction of spent LFP cathode was carried out from a commercially obtained 5 Ah cylindrical cell that was cycled at a current of 5 A for 1000 cycles in the voltage window from 2.5 to 4 V in the lab. Though the cell performed well in the initial cycles, capacity retention of merely 36% was observed at the end of 1000 cycles which is considered as failed cell (FIG. 1). The loss of Li in the sample is confirmed by the presence of $FePO_4$ denoted by asterisk in the spectra of FIG. 1a with the overall structure corresponding to that of LFP Olivine.

Dilithiation of Spent LFP Electrode to Prepare $FePO_4$:
Microwave Assisted Chemical Dilithiation:

For recycling the spent LFP electrode to prepare $FePO_4$, a microwave assisted chemical dilithiation to obtain spent $FePO_4$ powders (FP-MW) was carried out. The same $FePO_4$ powders (FP-MW) was used for both lithium and for sodium ion battery applications. The choice of microwave assisted process is in its potential to be used in lab scale as well as extendable to large scale and the process results in rapid material preparation. A stoichiometric mixture of spent LFP and $K_2S_2O_8$ (LFP:$K_2S_2O_8$ is 2:1 mole ratio, example: for 1 gram of spent LFP, 0.9 gram in 30 ml of DI water) was treated in a microwave at a power of 250 W for 15 minutes. Resulting solution was washed to neutralize the pH and dried to obtain delithiated LFP or $FePO_4$.

Conventional Hydrothermal Assisted Chemical Dilithiation:

For recycling the spent LFP electrode to prepare $FePO_4$, a conventional hydrothermal assisted chemical dilithiation to obtain spent $FePO_4$ powders (FP-MW) was carried out. The same $FePO_4$ powders (FP-MW) could be used for both lithium and for sodium ion battery applications. The choice of conventional hydrothermal assisted process is in its potential to be used in lab scale as well as extendable to large scale and the process results in rapid material preparation. A stoichiometric mixture of spent LFP and $K_2S_2O_8$ (LFP:$K_2S_2O_8$ is 2:1 mole ratio, example: for 1 gram of spent LFP, 0.9 gram in 30 ml of DI water) was treated in a conventional hydrothermal system at a temperature of 100° C. for 60 minutes. Resulting solution was washed to neutralize the pH and dried to obtain delithiated LFP or $FePO_4$.

Chemical Dilithiation:

For recycling the spent LFP electrode to prepare $FePO_4$, chemical dilithiation to obtain spent $FePO_4$ powders (FP-MW) was carried out. The same $FePO_4$ powders (FP-MW) was used for both lithium and for sodium ion battery applications. A stoichiometric mixture of spent LFP and $K_2S_2O_8$ was treated on a hot plate at 70° C. for 1 hour and the resulting solution was washed to neutralize the pH and dried to obtain delithiated LFP or $FePO_4$.

The possible chemical dilithiation reaction may be given as

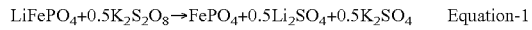

$LiFePO_4 + 0.5K_2S_2O_8 \rightarrow FePO_4 + 0.5Li_2SO_4 + 0.5K_2SO_4$   Equation-1

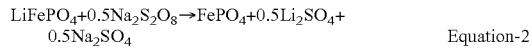

$LiFePO_4 + 0.5Na_2S_2O_8 \rightarrow FePO_4 + 0.5Li_2SO_4 + 0.5Na_2SO_4$   Equation-2

The high redox activity of $K_2S_2O_8/K_2SO_4$ couple resulted in the dilithiation/oxidation of spent-LFP to form $FePO_4$.

Regeneration of $Li_xFePO_4$ Spent Li-Ion Battery:

The homogenous $FePO_4$ obtained by dilithiation process either chemically or microwave assisted is subsequently lithiated chemically to form $LiFePO_4$ in LiI solution with stoichiometric concentration of LiI. 240 mg of $FePO_4$ mixed with a solution containing 320 mg of LiI in 10 ml of acetonitrile (excess LiI is required for complete lithiation of $FePO_4$) at a temperature of 100° C. for 15 min without any subsequent high temperature annealing process.

The possible chemical lithiation reaction may be given as

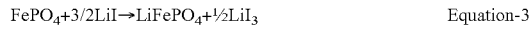

$FePO_4 + 3/2LiI \rightarrow LiFePO_4 + ½LiI_3$   Equation-3

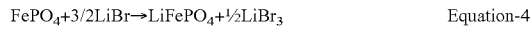

$FePO_4 + 3/2LiBr \rightarrow LiFePO_4 + ½LiBr_3$   Equation-4

The homogenous $FePO_4$ obtained by dilithiation process either chemically or microwave assisted is subsequently lithiated chemically to form $LiFePO_4$ in LiI solution with stoichiometric concentration of LiI. 240 mg of $FePO_4$ mixed with a solution containing 320 mg of LiI in 10 ml of acetonitrile (excess LiI is required for complete lithiation of $FePO_4$) at a temperature of 80° C. for 15 min without any subsequent high temperature annealing process.

Regeneration of $Na_xFePO_4$ from Spent Li-Ion Battery:

The homogenous $FePO_4$ obtained by dilithiation process either chemically or microwave assisted is subsequently sodiated chemically to form $NaFePO_4$ in NaI solution with stoichiometric concentration of Nat 240 mg of $FePO_4$ mixed with a solution containing 320 mg of NaI in 10 ml of acetonitrile (excess LiI is required for complete lithiation of $FePO_4$) at a temperature of 100° C. for 15 min without any subsequent high temperature annealing process The possible chemical sodiation reaction may be given as

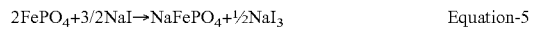

$2FePO_4 + 3/2NaI \rightarrow NaFePO_4 + ½NaI_3$   Equation-5

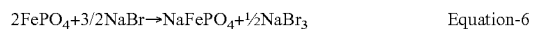

$2FePO_4 + 3/2NaBr \rightarrow NaFePO_4 + ½NaBr_3$   Equation-6

Figure 3:
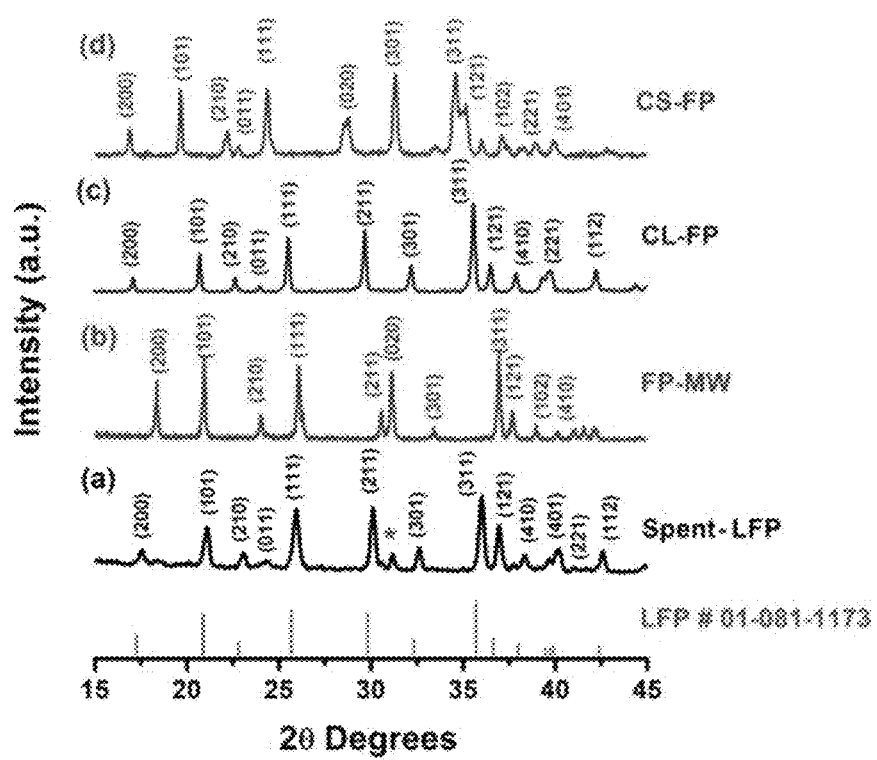
FIG. 3.: X-Ray diffraction pattern of (a) spent-LFP, (b) FP-MW, (c) CL-FP and (d) CS-FP. Standard LFP data from JCPDS file #01-081-1173 is also provided in the bottom panel.

The homogenous $FePO_4$ obtained by dilithiation process either chemically or microwave assisted is subsequently sodiated chemically to form $NaFePO_4$ in NaI solution with stoichiometric concentration of Nat 240 mg of $FePO_4$ mixed with a solution containing 320 mg of NaI in 10 ml of acetonitrile (excess LiI is required for complete lithiation of $FePO_4$) at a temperature of 80° C. for 15 min without any subsequent high temperature annealing process Structural, Morphological, and Surface Chemical Characterization of the Recovered $Li_xFePO_4$, Recycled $FePO_4$ and Regenerated CS-FP ($LiFePO_4$) and CL-FP ($NaFePO_4$):

The success of chemical dilithiation to obtain $FePO_4$ in the microwaved sample (FP-MW) was also investigated via XRD (FIG. 3b). The 15-minute microwave process was reasonably enough to completely delithiate the sample as can be seen from the XRD pattern. The resulting $FePO_4$ retained the orthorhombic crystal structure which was utilized for sodium ion battery applications. Extend of chemical lithiation and sodiation by using LiI/NaI was confirmed by XRD technique. FIG. 3c represents the LiI lithiated LFP (CL-FP) while FIG. 3d represents the NaI sodiated NFP (CS-FP). Both CL-FP and CS-FP holds olivine structure ($LiFePO_4$ and $NaFePO_4$) with Pnma space group. Thus, from the spectra it can be confirmed that effective lithiation/sodiation can be done by utilizing LiI/NaI as reducing agents.

Figure 4:
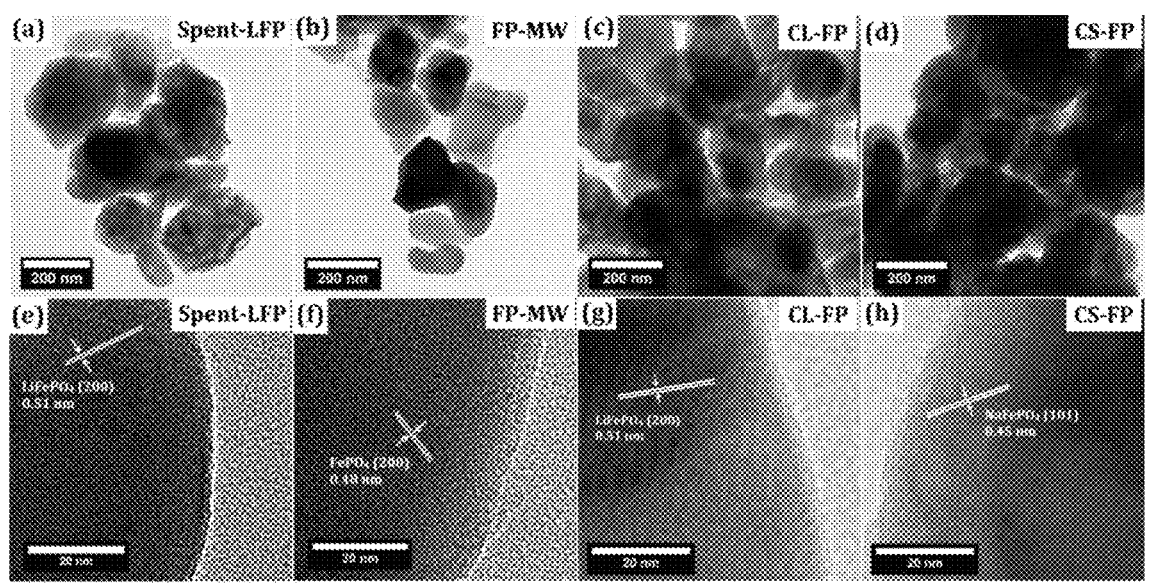
FIG. 4.: Low magnification TEM images of and high-resolution TEM images of (a & e) spent $LiFePO_4$, (b & F) chemically delithiated $FePO_4$ (c & g) CL-FP and (d & h) CS-FP.

FIG. 4a, b, c, d represents the low magnification TEM images and FIG. 4e, f, g, h represents the high-resolution TEM images of spent-LFP, MW processed FP, CL-FP and CS-FP respectively. TEM image provided as FIG. 4a shows that spent $LiFePO_4$ particles are irregular shaped with an average size range of nearly 200 nm. Chemically delithiated $FePO_4$ sample also held similar particle morphology as evident from the low magnification images (refer FIG. 4b). Thus, it can be confirmed that the microwave treatment could not invoke any morphological change rather it removes the Li present in the spent electrode without destructing the particle morphology. Similar particle size was observed for CL-FP (FIG. 4c) and CS-FP (FIG. 4d). This implies that chemical treatment with LiI/NaI does not invoke any morphological change as it was a low temperature process.

HRTEM images (FIG. 4e, f, g, h) further confirms the crystalline nature of all the samples. Spent $LiFePO_4$ hold a d-spacing consistent with the $LiFePO_4$ (0.51 nm corresponding to (200)) while microwave processed FePO$_4$ has a d-spacing of 0.48 nm corresponding to (200) planes. CL-FP sample was observed to have a d-spacing of 0.51 nm confirming proper lithiation while CS-FP sample holds a d-value of 0.45 nm consistent with the (101) plane of NaFePO$_4$.

Figure 5:
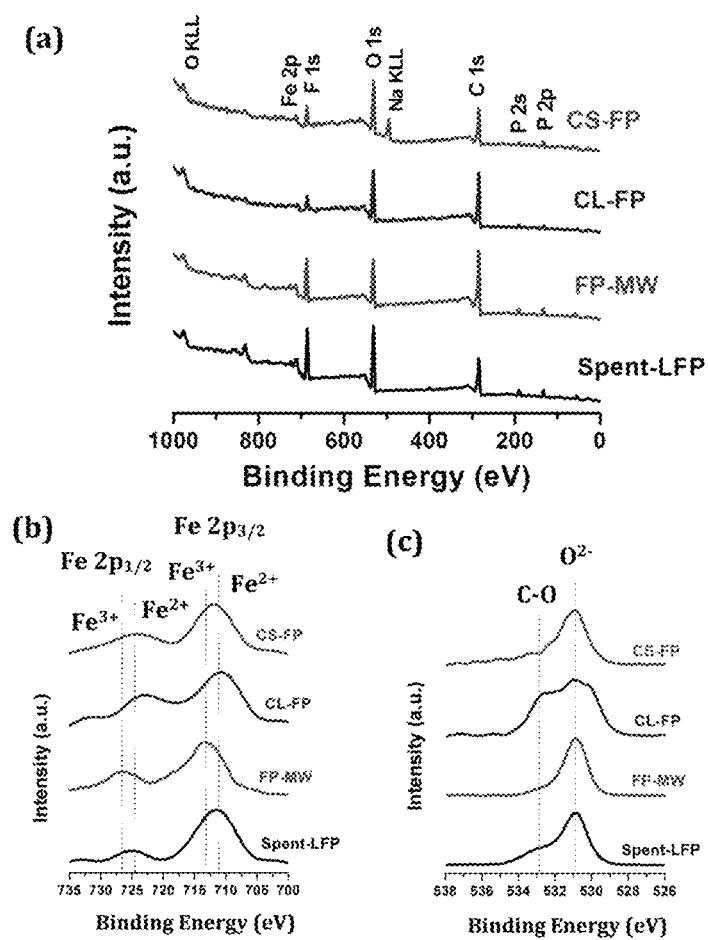
FIG. 5.: XPS spectra of spent $Li_xFePO_4$ and chemically delithiated $FePO_4$ (a) survey spectrum (b) Fe 2p and (c) O 1s.

Surface chemical analyses of the samples as seen in FIG. 5 were conducted using X-ray photo electron spectroscopy. FIG. 5a shows the XPS survey spectrum which provides information about the elements present in all four samples. All samples have similar elemental composition (Fe, P, O, C, F etc.) expect that CS-FP shows the presence of sodium (Na KLL) in the sample. Presence of fluorine in the sample can be related to the PVDF additive being used during electrode fabrication. High resolution Fe 2p can be utilized to confirm the oxidation change of Fe in the samples. As can be seen from the high-resolution Fe 2p spectra (FIG. 5b), spent-LFP sample holds mixed oxidation states of both $Fe^{2+}$ and $Fe^{3+}$. This could be due to the loss of Li in the cycled sample resulting in the occurrence of both LFP and FP in the sample and is consistent with the XRD spectrum provided before. However, FePO$_4$ was observed to have predominantly $Fe^{3+}$ which further confirms the complete dilithiation of spent electrode under microwave processing. Both CL-FP and CS-FP shows Fe $2p_{3/2}$ spectra peaks at around 711 eV confirming the prevalence of Fe in 2+ oxidation state. However, the slight shifts in peaks could be ascribed to the delocalized surface distortions emerging due to the chemical treatment processes. O 1s (FIG. 5c) indicates peaks at ~531 eV, corresponding to the lattice oxygen and is consistent for all the samples. Nevertheless, an additional peak was observed around 533 eV in the CL-FP sample which correlates to the surface carbon contamination (emerging due to carbon additive).

Figure 2:
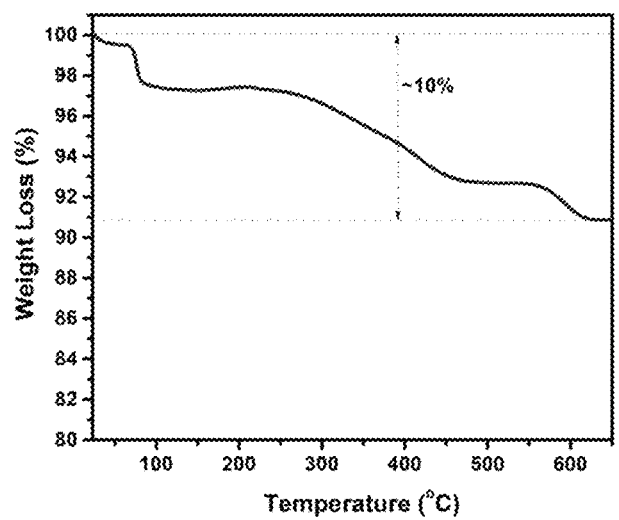
FIG. 2.: TGA analysis of the spent LFP electrode from 23° C. to 650° C. in air.
Figure 6:
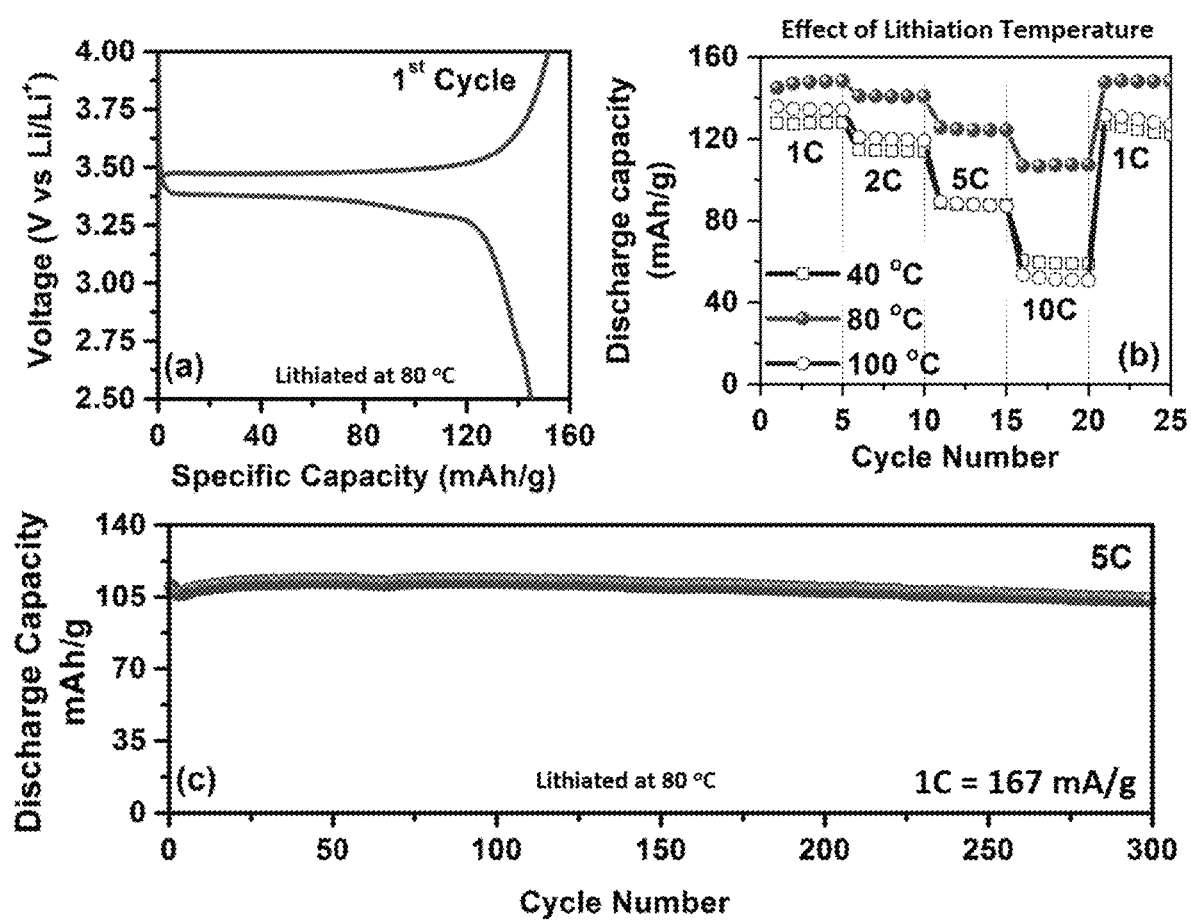
FIG. 6.: Electrochemical Performance of Microwave prepared $FePO_4$ Upon Chemical Lithiation (a) $1^{st}$ cycle charge-discharge profile at 1C rate (lithiated at 80° C.) (b) LIB rate performances of chemically lithiated $FePO_4$ electrodes at different rates (lithiated at three different temperatures) and (c) cycling performance of CL-FP electrode at 5C for 300 cycles (lithiated at 80° C.)
Figure 8:
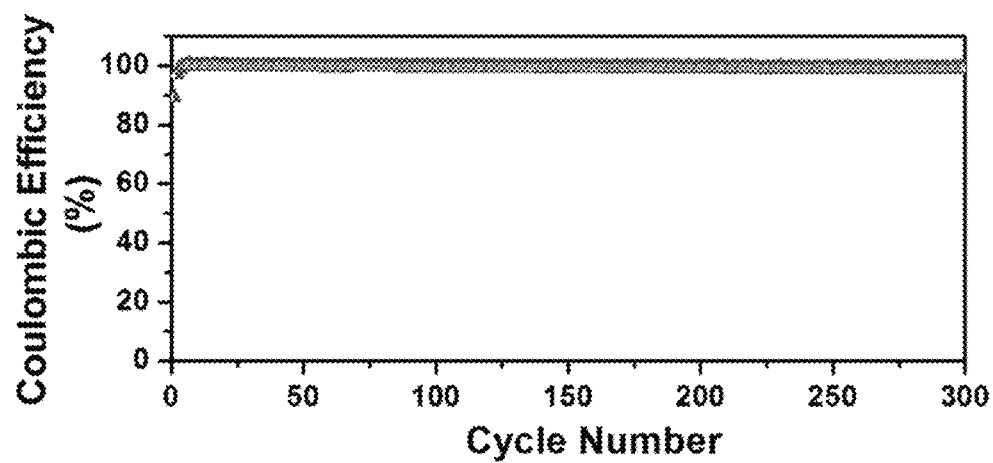
FIG. 8.: Coulombic Efficiency plot of LiI-FP LIB cell at 5C rate.

Electrochemical Characterizations:

Failure of a commercial lithium-ion cell could predominantly be because of three reasons. i) failure of battery components (anode/cathode/current collector), ii) electrolyte boil off/leakage and iii) battery abuse (overcharging, dendritic growth, gas evolution etc.). Herein, cycled commercial cell retained only 36% of its initial capacity at the end of 1000 cycles. This can be considered as a completely drained cell. This spent LFP electrode was reused for lithium-ion battery applications. In order to do so, the spent LFP material recovered from the failed commercial cell (without any processing upon recovery) was slurry casted. TGA analysis was done on the spent electrode to confirm the weight percentage of LFP in the commercial cell and was estimated to be nearly 90% (FIG. 2). Depending on the concentration of LiI, complete lithiation is possible and this transformation is visible from the XRD spectrum provided as FIG. 3c. This chemically lithiated LiFePO$_4$ (CL-FP) was tested for its electrochemical performances as a lithium-ion battery cathode. The half-cell was initially tested at a rate of 1C (FIG. 6a) wherein the cell delivered a discharge capacity of 145 mAh/g (all the capacities values are based on the active weight of LFP) which further confirm the potential of this chemical lithiation process. FIG. 6b indicates the rate capability of the half-cell wherein the cell delivered discharge capacity of 107 mAh/g even at a high rate of 10C. Another feature is the capability of the cell to deliver capacity of 148 mAh/g even after ramping from 10C to 1C, which denotes its excellent reversibility. FIG. 6c shows the cycling performance of the regenerated LFP for 300 cycles at a rate of 5C. The electrode demonstrated a flat discharge capacity profile with a value of 110.5 mAh/g and a retention value of 95% at the end of 300 cycles. Moreover, the Coulombic efficiency value reached 99% in the $3^{rd}$ cycle and stable thereafter demonstrating excellent reversibility (refer FIG. 8). Thus, based on the above results chemical lithiation taught by the present invention can be considered as a feasible approaching in recycling and regeneration of spent LFP based batteries.

The obtained sample was structurally characterized using XRD analysis and confirmed the crystal structure as NaFePO$_4$ (refer FIG. 3d).

Figure 7:
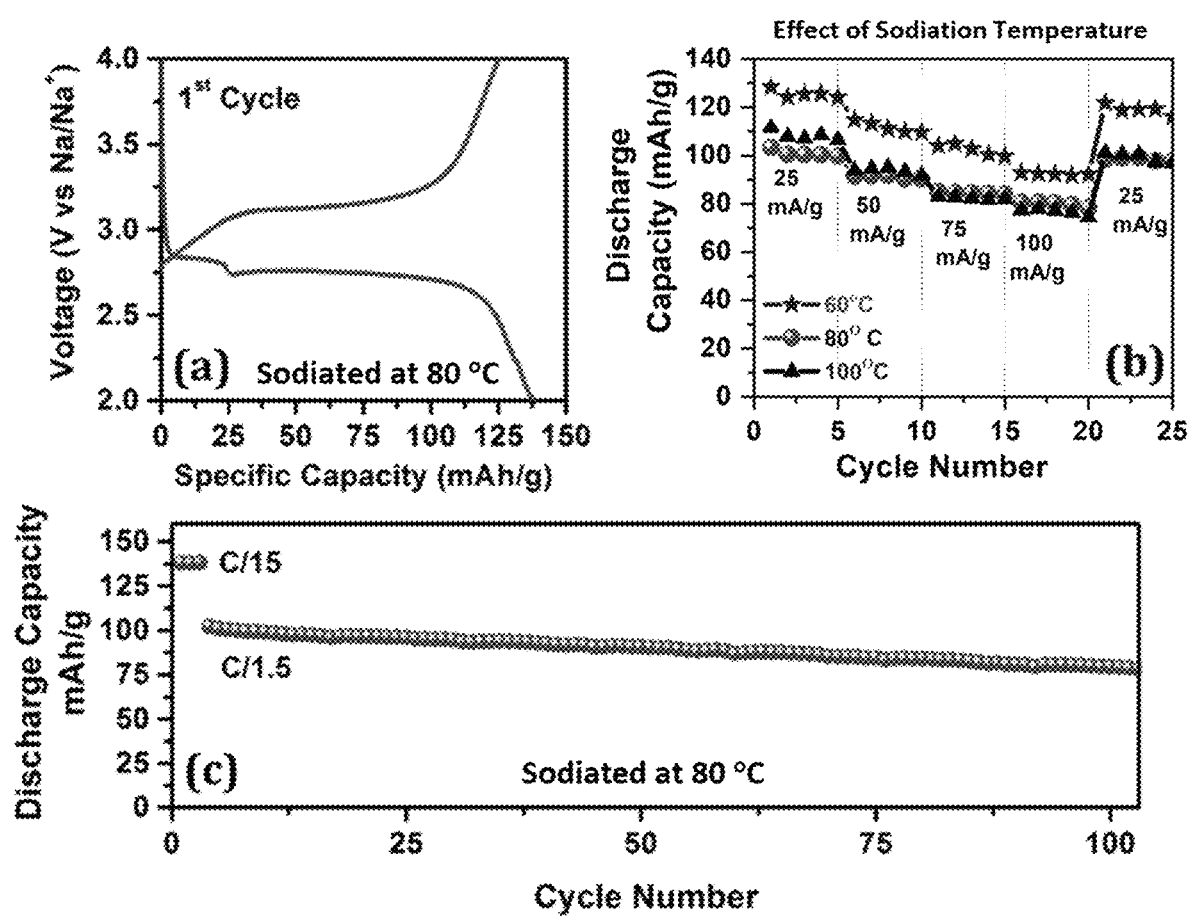
FIG. 7.: Electrochemical Performance of Microwave prepared $FePO_4$ Upon Chemical Sodiation (a) $1^{st}$ cycle charge-discharge profile of chemically sodiated $FePO_4$ sample at C/15 (Sodiated at 80° C.) (b) NIB rate performances of chemically sodiated $FePO_4$ electrodes at different rates as indicated in legend (Sodiated at three different temperatures) and (c) cycling performance of the same electrode, initial 3 cycles at C/15 and then at C/1.5 (Sodiated at 80° C.).
Figure 9:
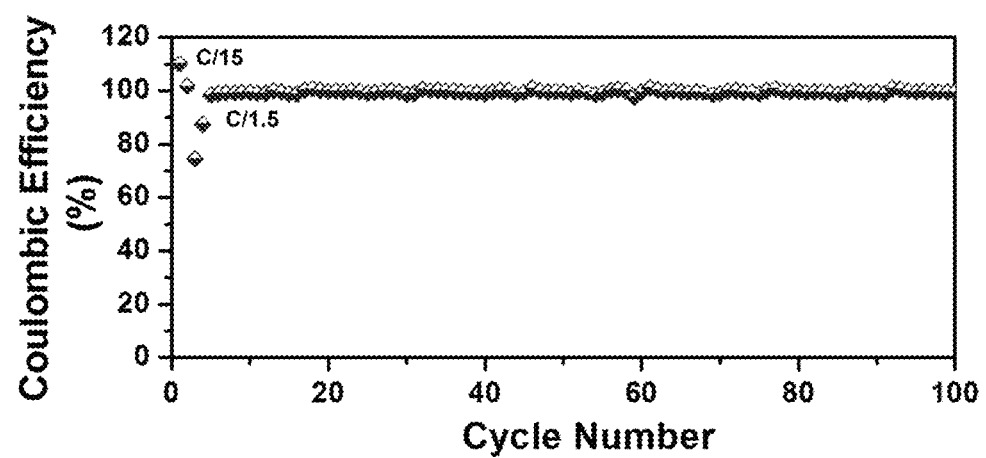
FIG. 9.: Coulombic Efficiency plot of NaI-FP sodium ion cell, first 3 cycles at C/15 and following cycles at C/1.5.
Figure 10:
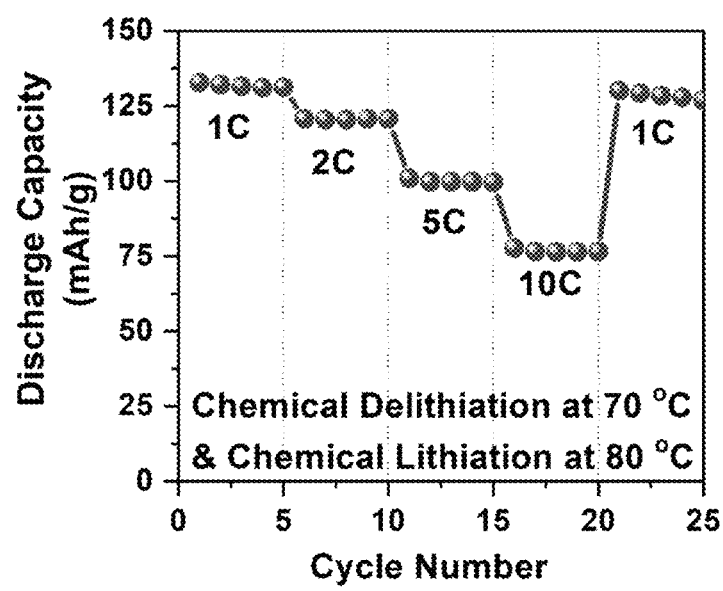
FIG. 10.: Electrochemical rate performance of Chemically delithiated $FePO_4$ (at 70° C.) and Chemical lithiated (at 80° C.).

FIG. 7 display the electrochemical performance of the chemically sodiated FePO$_4$ electrode. At a current density of C/15, the electrode delivered charge capacity of 125 mAh/g while the discharge capacity improved to 138 mAh/g. FIG. 7b shows the rate performance of the electrodes at rates ranging from C/6 to C/1.5, as indicated in the figure. Even after ramping from C/6 to C/1.5, the chemically sodiated electrode maintained 79% of the capacity which was delivered at C/6. Moreover, reverting the cell back to C/6 from C/1.5, the delivered capacity was almost 96% of the value provided at the $5^{th}$ cycle. Cycling study was also tested similar to electrochemically sodiated cell, initial 3 cycles at C/15 and then at C/1.5. Capacity delivered at the initial 3 cycles was 138 mAh/g and was further able to retain 77% of the initial capacity displayed at C/1.5 for 100 cycles. Though the initial Coulombic efficiency was beyond 100% (since additional sodium is supplemented from the metallic electrode), the cell delivered an average Coulombic efficiency of 99.5% in the subsequent cycles (FIG. 9). From the electrochemical results it can be confirmed that a commercially viable chemical sodiation process can also be adopted in recycling such spent LFP batteries. From the data provided in Table 1 and Table 2, it can be seen that the present set of data is comparable to freshly prepared NaFePO$_4$ sodium ion battery reports and freshly prepared LiFePO$_4$ lithium ion battery reports available in literature. The chemically delithiated (on a hot plate at 70° C.) was tested for its electrochemical rate performance and the results are displayed in FIG. 10.

TABLE 1

Electrochemical performance comparison of NaFePO$_4$ cathodes available in literature

| Sl. No. | NaFePO$_4$ Sample Details | C-Rate or (Current) | Capacity (mAh/g) | Reference |
|---|---|---|---|---|
| 1 | NaFePO$_4$-MWCNT | C/10 (15.4 mA/g) | 90 | 24 |
| 2 | Triphylate NaFePO$_4$ | C/10 (15.4 mA/g) | 132 | 25 |
|   |   | 1C (154 mA/g) | 95 |   |
|   |   | 5C (770 mA/g) | 66 |   |
|   |   | 20C (3080 mA/g) | 25 |   |
| 3 | NaFePO$_4$ | C/20 (7.5 mA/g) | 120 | 26 |
|   |   | 1C (154 mA/g) | 60 |   |

TABLE 1-continued

Electrochemical performance comparison of
$NaFePO_4$ cathodes available in literature

| Sl. No. | $NaFePO_4$ Sample Details | C-Rate or (Current) | Capacity (mAh/g) | Reference |
|---|---|---|---|---|
| 4 | Olivine $NaFePO_4$ microsphere | C/10 (15.4 mA/g) | 111 | 27 |
|  |  | 1C (154 mA/g) | 71 |  |
|  |  | 2C (308 mA/g) | 46 |  |
| 5 | Polythiophene coated $NaFePO_4$ | C/15.4 (10 mA/g) | 141.5 | 28 |
|  | Uncoated $NaFePO_4$ |  | 108 |  |
| 6 | $NaFePO_4$/Graphene | C/10 (15.5 mA/g) | 142 | 29 |
|  |  | 1C (154 mA/g) | 79 |  |
|  |  | 3C (462 mA/g) | 67 |  |
|  |  | 5C (770 mA/g) | 51 |  |
| 7 | $NaFePO_4$ | C/20 (7.5 mA/g) | 125 | 30 |
| 8 | Maricite $NaFePO_4$ | C/20 (7.5 mA/g) | 142 | 31 |
| 9 | FP-MW (1C assumed as 167 mAh/g) | C/15 (11.11 mA/g) | 159 | This work |
|  |  | C/6 (27.75 mA/g) | 139 |  |
|  |  | C/3 (83.25 mA/g) | 114 |  |
|  |  | C/1.5 (111 mA/g) | 100 |  |
| 10 | CS-FP (1C assumed as 167 mAh/g) | C/15 (11.11 mA/g) | 138 | This work |
|  |  | C/6 (27.75 mA/g) | 120 |  |
|  |  | C/3 (83.25 mA/g) | 107 |  |
|  |  | C/1.5 (111 mA/g) | 95 |  |

TABLE 2

Electrochemical performance comparison of fresh
$LiFePO_4$ cathodes available in literature with
reused and recycled LFP cells (1C = 167 mA/g)

| Sl No. | $LiFePO_4$ Sample details | C-Rate | Capacity (mAh/g) | Reference |
|---|---|---|---|---|
| 1 | LFP | C/5 | 110 | 32 |
|  |  | 1C | 80 |  |
|  | LFP + 1% Cu | C/5 | 140 |  |
|  |  | 1C | 100 |  |
| 2 | C-LFP | C/10 | 145 | 33 |
|  |  | 10C | 50 |  |
|  | C-LFP/7% Polypyrrole | C/10 | 148 |  |
|  |  | 10C | 100 |  |
| 3 | LFP Bare | C/10 | 146 | 34 |
|  |  | 5C | 90 |  |
|  | LFP Surfactant | C/10 | 170 |  |
|  |  | 5C | 142 |  |
| 4 | LFP | C/10 | 132 | 35 |
|  |  | 5C | 83.4 |  |
| 5 | LFP | C/10 | 118 | 36 |
|  | F-Doped LFP | C/10 | 175 |  |
| 6 | LFP | C/10 | 140 | 37 |
|  |  | 10C | 70 |  |
|  | LFP/Nanofibers | C/10 | 150 |  |
|  |  | 10C | 80 |  |
| 7 | LFP @ Glucose | C/5 | 160 | 38 |
|  |  | 10C | 100 |  |
| 8 | Commercial LFP | 1C | 130 | 39 |
|  |  | 30C | 60 |  |
|  | Self-assembled LFP | 1C | 150 |  |
|  |  | 30C | 110 |  |
| 9 | Recycled LFP | 1C | 150 | This work |
|  |  | 10C | 95 |  |
| 10 | CL-FP | 1C | 145 | This work |
|  |  | 10C | 107 |  |

Advantages

Thus, the present invention demonstrates a facile way and means to reuse/recycle/regenerate spent LFP for lithium as well as sodium ion battery applications. It is well established that the spent Lithium ferro phosphate battery (LFP) electrode can be reused for lithium-ion battery without much complicated processing or high temperature treatment.

REFERENCES

1. Padhi, A. K. Phospho-Olivines as Positive-Electrode Materials for Rechargeable Lithium Batteries. *J. Electrochem. Soc.* 1997, 144 (4), 1188.
2. Wang, W.; Wu, Y. An Overview of Recycling and Treatment of Spent $LiFePO_4$ Batteries in China. *Resour. Conserv. Recycl.* 2017, 127 (100), 233-243.
3. Lebedeva, N, et. al., Lithium Ion Battery Value Chain and Related Oppurtunities for Europe, European Commission, Petten, 2016
4. Elwert, T.; Hua, Q.; Schneider, K. Recycling of Lithium Iron Phosphate Batteries: Future Prospects and Research Needs. *Mater. Sci. Forum* 2019, 959, 49-68.
5. Ioakimidis, C. S.; Murillo-Marrodán, A.; Bagheri, A.; Thomas, D.; Genikomsakis, K. N. Life Cycle Assessment of a Lithium Iron Phosphate (LFP) Electric Vehicle Battery in Second Life Application Scenarios. *Sustain.* 2019, 11 (9), 2527.
6. Yang, Y.; Zheng, X.; Cao, H.; Zhao, C.; Lin, X.; Ning, P.; Zhang, Y.; Jin, W.; Sun, Z. A Closed-Loop Process for Selective Metal Recovery from Spent Lithium Iron Phosphate Batteries through Mechanochemical Activation. *ACS Sustain. Chem. Eng.* 2017, 5 (11), 9972-9980.
7. Li, X.; Zhang, J.; Song, D.; Song, J.; Zhang, L. Direct Regeneration of Recycled Cathode Material Mixture from Scrapped $LiFePO_4$ Batteries. *J. Power Sources* 2017, 345, 78-84.
8. Elwert, T., et. al., Recycling of Lithium Iron Phosphate Batteries: Future Prospects and Research Need, Materials Science Forum, 2019, 959, 49-68.
9. Li, H.; Xing, S.; Liu, Y.; Li, F.; Guo, H.; Kuang, G. Recovery of Lithium, Iron, and Phosphorus from Spent $LiFePO_4$ Batteries Using Stoichiometric Sulfuric Acid Leaching System. *ACS Sustain. Chem. Eng.* 2017, 5 (9), 8017-8024.
10. Song, X.; Hu, T.; Liang, C.; Long, H. L.; Zhou, L.; Song, W.; You, L.; Wu, Z. S.; Liu, J. W. Direct Regeneration of Cathode Materials from Spent Lithium Iron Phosphate Batteries Using a Solid Phase Sintering Method. *RSC Adv.* 2017, 7 (8), 4783-4790.

11. Kim, H. S., et. al., Method of fabricating LiFePO4 Cathode Electroactive Material by Recycling, and LiFePO4 Cathode Electroactive Material, LiFePO4 Cathode, and Lithium Secondary Battery Fabricated Thereby, U.S. Pat. No. 9,199,850B2 (December, 2015).
12. Wang, Y., et. al., Method and Apparatus for Recycling Lithium Iron Phosphate Batteries, US Patent US2018/0261894 A1 (September, 2018).
13. Dodd, J. L.; Yazami, R.; Fultz, B. Phase Diagram of $Li_xFePO_4$. *Electrochem. Solid-State Lett.* 2006, 9 (3), A151.
14. Yang, F.; Zhang, H.; Shao, Y. J.; Song, H.; Liao, S.; Ren, J. Formic Acid as Additive for the Preparation of High-Performance $FePO_4$ Materials by Spray Drying Method. *Ceram. Int* 2017, 43 (18), 16652-16658.
15. Peng, L.; Zhao, Y.; Ding, Y.; Yu, G. Self-Assembled LiFePO4 Nanowires with High Rate Capability for Li-Ion Batteries. *Chem. Commun.* 2014, 50 (67), 9569-9572.
16. Lin, M.; Wu, X.; Chen, B. L.; Yuan, J. K. Hydrothermal Synthesis of Corn Cob-Like $LiFePO_4/C$ as High Performance Cathode Material for Lithium Ion Batteries. *Adv. Sci. Technol.* 2014, 93 (November 2014), 152-157.
17. Shin, E. J.; Kim, S.; Noh, J. K.; Byun, D.; Chung, K. Y.; Kim, H. S.; Cho, B. W. A Green Recycling Process Designed for $LiFePO_4$ Cathode Materials for Li-Ion Batteries. *J. Mater. Chem. A* 2015, 3 (21), 11493-11502.
18. Yang, Y.; Meng, X.; Cao, H.; Lin, X.; Liu, C.; Sun, Y.; Zhang, Y.; Sun, Z. Selective Recovery of Lithium from Spent Lithium Iron Phosphate Batteries: A Sustainable Process. *Green Chem.* 2018, 20 (13), 3121-3133.
19. Dedryvère, R.; Maccario, M.; Croguennec, L.; Le Cras, F.; Delmas, C.; Gonbeau, D. X-Ray Photoelectron Spectroscopy Investigations of Carbon-Coated $Li_xFePO_4$ Materials. *Chem. Mater.* 2008, 20 (22), 7164-7170.
20. Wen, J.; Yu, Y.; Chen, C. A Review on Lithium-Ion Batteries Safety Issues: Existing Problems and Possible Solutions. *Mater. Express* 2012, 2 (3), 197-212.
21. Dąbrowska, S.; Chudoba, T.; Wojnarowicz, J.; Łojkowski, W. Current Trends in the Development of Microwave Reactors for the Synthesis of Nanomaterials in Laboratories and Industries: A Review. *Crystals* 2018, 8 (10), 1-26.
22. Cao, Y.; Zhang, T.; Zhong, X.; Zhai, T.; Li, H. A Safe, Convenient Liquid Phase Pre-Sodiation Method for Titanium-Based SIB Materials. *Chem. Commun.* 2019, 55 (98),
23. Wang, L.; Li, J.; Zhou, H.; Huang, Z.; Tao, S.; Zhai, B.; Liu, L.; Hu, L. Regeneration Cathode Material Mixture from Spent Lithium Iron Phosphate Batteries. *J. Mater. Sci. Mater. Electron.* 2018, 29 (11), 9283-9290.
24. Karthik, M.; Sathishkumar, S.; BoopathiRaja, R.; Meganathan, K. L.; Sumathi, T. Design and Fabrication of $NaFePO_4$/MWCNTs Hybrid Electrode Material for Sodium-Ion Battery. *J. Mater. Sci. Mater. Electron.* 2020.
25. Berlanga, C.; Armand, M.; Casas-cabanas, M. Cost-Effective Synthesis of Triphylite—$NaFePO_4$ Cathode: A Zero-Waste Process. 2020, 8, 725-730.
26. Wongittharom, N.; Lee, T. C.; Wang, C. H.; Wang, Y. C.; Chang, J. K. Electrochemical Performance of $Na/NaFePO_4$ Sodium-Ion Batteries with Ionic Liquid Electrolytes. *J. Mater. Chem. A* 2014, 2 (16), 5655-5661.
27. Fang, Y.; Liu, Q.; Xiao, L.; Ai, X.; Yang, H.; Cao, Y. High-Performance Olivine $NaFePO_4$ Microsphere Cathode Synthesized by Aqueous Electrochemical Displacement Method for Sodium Ion Batteries. *ACS Appl. Mater. Interfaces* 2015, 7 (32), 17977-17984.
28. Ali, G.; Lee, J. H.; Susanto, D.; Choi, S. W.; Cho, B. W.; Nam, K. W.; Chung, K. Y. Polythiophene-Wrapped Olivine $NaFePO_4$ as a Cathode for Na-Ion Batteries. *ACS Appl. Mater. Interfaces* 2016, 8 (24), 15422-15429.
29. Rahman, M. M.; *Sultana*, I.; Mateti, S.; Liu, J.; Sharma, N.; Chen, Y. Maricite $NaFePO_4$/C/Graphene: A Novel Hybrid Cathode for Sodium-Ion Batteries. *J. Mater. Chem. A* 2017, 5 (32), 16616-16621.
30. Oh, S. M.; Myung, S. T.; Hassoun, J.; Scrosati, B.; Sun, Y. K. Reversible $NaFePO_4$ Electrode for Sodium Secondary Batteries. *Electrochem. commun.* 2012, 22 (1), 149-152.
31. Kim, J.; Seo, D.-H.; Kim, H.; Park, I.; Yoo, J.-K.; Jung, S.-K.; Park, Y.-U.; Goddard III, W. A.; Kang, K. Unexpected Discovery of Low-Cost Maricite $NaFePO_4$ as a High-Performance Electrode for Na-Ion Batteries. *Energy Environ. Sci.* 2015, 8 (2), 540-545.
32. Croce, F.; D'Epifanio, A.; Hassoun, J.; Deptula, A.; Olczac, T.; Scrosati, B. A Novel Concept for the Synthesis of an Improved $LiFePO_4$ Lithium Battery Cathode. *Electrochem. Solid-State Lett.* 2002, 5 (3), 47-50.
33. Huang, Y. H.; Goodenough, J. B. High-Rate LiFePO4 Lithium Rechargeable Battery Promoted by Electrochemically Active Polymers. *Chem. Mater.* 2008., 20 (23), 7237-7241.
34. Choi, D.; Kumta, P. N. Surfactant Based Sol-Gel Approach to Nanostructured $LiFePO_4$ for High Rate Li-Ion Batteries. J. Power Sources 2007,163 (2), 1064-1069.
35. Liu, Y.; Gu, Y.-J.; Luo, G.-Y.; Chen, Z.-L.; Wu, F.-Z.; Dai, X.-Y.; Mai, Y.; Li, J.-Q. Ni-Doped LiFePO4/C as High-Performance Cathode Composites for Li-Ion Batteries. Ceram. Int. 2020, 46 (10), 14857-14863.
36. Wang, X.; Feng, Z.; Hou, X.; Liu, L.; He, M.; He, X.; Huang, J.; Wen, Z. Fluorine Doped Carbon Coating of LiFePO4 as a Cathode Material for Lithium-Ion Batteries. Chem. Eng. J. 2020, 379 (July 2019), 122371.
37. Adepoju, A. A.; Williams, Q. L. High C-Rate Performance of LiFePO4/Carbon Nanofibers Composite Cathode for Li-Ion Batteries. Curr. Appl. Phys. 2020, 20 (1), 1-4.
38. Yuan, M.; Li, Y.; Zhang, K.; Li, Y.; Yao, Y. One-Step Liquid Phase Synthesis of LiFePO4@C Composite as High Performance Cathode Material for Lithium-Ion Batteries. Nano 2020, 15 (06), 2050080.
39. Peng, L.; Zhao, Y.; Ding, Y.; Yu, G. Self-Assembled LiFePO4 Nanowires with High Rate Capability for Li-Ion Batteries. Chem. Commun. 2014, 50 (67), 9569-9572.

The invention claimed is:

1. A closed loop process for regeneration of LifePO.sub.4 or NaFePO.sub.4 cathode from spent Lithium ferro phosphate (LFP) rechargeable battery, the closed loop process comprising steps of: a) de-lithiating a spent LFP electrode by microwave assisted chemical delithiation, conventional hydrothermal assisted chemical delithiation or chemical delithiation with an oxidizer, wherein a ratio of LFP to oxidizer is 2:1 to form pure FePO4, chemical delithiation at a temperature range of 20° C. . . . 150° C. for time ranging from 5 minutes-24 hours; b) chemically lithiating the pure FePO.sub.4 by adding a lithiation agent in a solvent based on any amount of the pure FePO.sub.4 in a stoichiometric ratio of the pure FePO.sub.4 to lithiation agent at a temperature range of 25° C.-100° C. for lithiation time ranging 1-30 minutes; or c) chemically sodiating the pure FePO.sub.4 by adding a sodiating agent in a solvent based on any amount of pure FePO.sub.4 in stoichiometric ratio of the pure FePO.sub.4 to sodiating agent at a temperature of 25° C.-100° C. for sodiation time ranging 1-30 minutes; d)

obtaining the LiFePO.sub.4 or NaFePO.sub.4 cathode from the spent Lithium ferro phosphate battery (LFP) rechargeable battery-, wherein the stoichiometric ratio of the pure FePO.sub.4 to the lithiation agent is 1:1.0-3.5, and wherein the stoichiometric ratio of the pure FePO.sub.4 to the sodiating agent is 1:1.0-4.2.

2. The closed loop process as claimed in claim 1, wherein the oxidizer is one of potassium persulphate or sodium persulphate or a combination thereof.

3. The closed loop process as claimed in claim 1, wherein the ratio of the spent LFP electrode to the oxidizer is 2:1 in DI water.

4. The closed loop process as claimed in claim 1, wherein the solvent, for lithiation is one of acetonitrile or isopropyl alcohol or a combination thereof.

5. The closed loop process as claimed in claim 1, wherein the lithiation agent is LiI or LiBr.

6. The closed loop process as claimed in claim 1, wherein the sodiating agent is NaI or NaBr.

7. The closed loop process as claimed in claim 1, wherein the delithiating is carried out using the micro-wave assisted chemical delithiation or the chemical delithiation with an oxidizer.

8. The closed loop process as claimed in claim 7, wherein the delithiating is carried out for 15 mins in the microwave assisted chemical delithiation at 250 W in deionized water.

9. The closed loop process as claimed in claim 7, wherein the chemical delithiation with an oxidizer is carried out 24 hrs.

\* \* \* \* \*